United States Patent
Kumar et al.

(10) Patent No.: US 9,790,878 B2
(45) Date of Patent: Oct. 17, 2017

(54) ONE DIMENSIONAL THREE WAY CATALYST MODEL FOR CONTROL AND DIAGNOSTICS

(71) Applicant: Ford Global Technologies, LLC, Dearborn, MI (US)

(72) Inventors: Pankaj Kumar, Dearborn, MI (US); Imad Hassan Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 799 days.

(21) Appl. No.: 14/158,443

(22) Filed: Jan. 17, 2014

(65) Prior Publication Data

US 2015/0204258 A1    Jul. 23, 2015

(51) Int. Cl.
*F01N 3/00* (2006.01)
*F02D 41/02* (2006.01)
(Continued)

(52) U.S. Cl.
CPC ......... *F02D 41/0235* (2013.01); *F01N 3/10* (2013.01); *F01N 11/007* (2013.01); *F02D 41/0295* (2013.01); *F02D 41/1441* (2013.01); *F02D 41/1456* (2013.01); *F02D 41/18* (2013.01); *G01M 15/104* (2013.01); *F01N 3/101* (2013.01); *F01N 2900/0406* (2013.01); *F01N 2900/1624* (2013.01); *F02D 41/064* (2013.01);
(Continued)

(58) Field of Classification Search
CPC .... F01N 3/10; F01N 3/101; F01N 2900/0406; F01N 2900/1624; F01N 11/007; F02D 2041/1472; F02D 2200/0814; F02D 2200/0816; F02D 2200/101; F02D 41/0235; F02D 41/0295; F02D 41/064; F02D 41/1441; F02D 41/1452; F02D 41/1454; F02D 41/1456; F02D 41/1458; F02D 41/1462; F02D 41/18; Y02T 10/22; Y02T 10/47
USPC .................................................. 60/277, 299
See application file for complete search history.

(56) References Cited

U.S. PATENT DOCUMENTS 6,116,021 A * 9/2000 Schumacher ........... F01N 11/00
                                                     123/674
7,673,445 B2    3/2010 Goralski, Jr. et al.
(Continued)

OTHER PUBLICATIONS

Kumar, Pankaj et al., "A low-dimensional model for describing the oxygen storage capacity and transient behavior of a three-way catalytic converter," Chemical Engineering Science 73 (2012): 373-387, 15 pages.
(Continued)

*Primary Examiner* — Phutthiwat Wongwian
*Assistant Examiner* — Diem Tran
(74) *Attorney, Agent, or Firm* — Julia Voutyras; McCoy Russell LLP (57) ABSTRACT

A method comprising adjusting a fuel injection amount based on a fractional oxidation state of a catalyst, the fractional oxidation state based on reaction rates of grouped oxidant and reductant exhaust gas species throughout a catalyst and a low-dimensional physics-based model derived from a detailed two-dimensional model to obtain a one-dimensional model averaged over time and space that accounts for diffusion limitations in the washcoat and accurately predicts emissions during cold start.

18 Claims, 7 Drawing Sheets

(51) Int. Cl.
G01M 15/10 (2006.01)
F01N 11/00 (2006.01)
F02D 41/18 (2006.01)
F01N 3/10 (2006.01)
F02D 41/14 (2006.01)
F02D 41/06 (2006.01)

(52) U.S. Cl.
CPC ...... F02D 41/1452 (2013.01); F02D 41/1454 (2013.01); F02D 41/1458 (2013.01); F02D 41/1462 (2013.01); F02D 2041/1472 (2013.01); F02D 2200/0814 (2013.01); F02D 2200/0816 (2013.01); F02D 2200/101 (2013.01); Y02T 10/22 (2013.01); Y02T 10/47 (2013.01)

(56) References Cited

U.S. PATENT DOCUMENTS

2005/0262828 A1 12/2005 Iihoshi et al.
2013/0078725 A1 3/2013 Makki et al.
2013/0180509 A1 7/2013 Makki et al.
2013/0245919 A1 9/2013 Kumar et al.

OTHER PUBLICATIONS

Auckenthaler, Theophil S. et al., "Modeling of a Three-Way Catalytic Converter with Respect to Fast Transients of $\lambda$-Sensor Relevant Exhaust Gas Components," Industrial Engineer Chemical Research, vol. 43, 2004, 4780-4788, 9 pages.

Auckenthaler, Theophil S., "Modelling and Control of Three-Way Catalytic Converters," Dissertation, Swiss Federal Institute of Technology of Zurich, 2005, 27 pages.

Joshi, Saurabh Y. et al., "Low-Dimensional Models for Real Time Simulations of Catalytic Monoliths," AIChE Journal 55, 2009, 1771-1783, 13 pages.

Gupta, Nikunj, et al., "Heat and Mass Transfer Coefficients in Catalytic Monoliths," Chemical Engineering Science, vol. 56, 2001, 4771-4786, 16 pages.

* cited by examiner

ONE DIMENSIONAL THREE WAY CATALYST MODEL FOR CONTROL AND DIAGNOSTICS

FIELD

The present disclosure relates to feedback control of air-fuel ratio in an internal combustion engine.

BACKGROUND AND SUMMARY

Exhaust gas emissions control in a gasoline engine utilizing a catalyst is most efficient when the catalyst feedgas air-fuel ratio is near stoichiometry. During real world operation of the gasoline engine, excursions from stoichiometry may occur. Ceria is commonly added to a catalyst to act as a buffer for oxygen storage to help curb the breakthrough of emissions and increase the operating window about the stoichiometric air-fuel ratio. The stored oxygen may be maintained at a desired set point based on catalyst monitor sensors and/or physics-based catalyst models.

One approach to control and diagnose exhaust gas emissions utilizes a physics-based model to determine the level of stored oxygen in a catalyst which includes a plurality of partial differential equations in one or more dimensions with a plurality of exhaust gas species. Another approach utilizes an axially averaged physics-based zero dimensional model which includes a plurality of exhaust gas species which may be grouped into an oxidant group and a reductant group.

However, the inventors have recognized an issue with the above approaches. Determining the level of stored oxygen utilizing a model that includes a plurality of partial differential equations in one or more dimensions may be difficult to implement and may require more processing power than typically available in an engine controller. Further, utilizing a zero dimensional model may neglect parameters and may not accurately predict emissions during cold start due to the reduced order of the model.

Thus in one example, the above issue may be at least partly addressed by a method for an engine exhaust system. In one embodiment, the method comprises adjusting a fuel injection amount based on a fractional oxidation state of a catalyst, the fractional oxidation state based on reaction rates of exhaust gas species in a one-dimensional model averaged over space and time mass balance and energy balance equations for a fluid phase and a washcoat of the catalyst. The gradients in the transverse direction are accounted for in the internal and external mass transfer coefficients. This may improve computational time of the one dimensional model by grouping the chemical exhaust gas species into two or fewer groups which may include an oxidant group and a reductant group wherein a single value of diffusivity may be used.

For example, the fractional oxidation state may be determined based on the one-dimensional model derived from a detailed two-dimensional model. The model may track the evolution of two or fewer grouped exhaust chemical species through the catalyst. Further, the model also accounts for the diffusion within the washcoat where the reactions take place through the use of effective mass transfer concept. In this way, a simplified one-dimensional model may be used to predict both a total oxygen storage capacity and fractional oxidation state of the catalyst. These may be used in feedback control of the engine air-fuel ratio in order to maintain the fractional oxidation state of the catalyst at a desired amount. Further, catalyst degradation may be indicated if the catalyst activity or the total oxygen storage amount is below a threshold.

The present disclosure may offer several advantages. For example, processing resources devoted to the catalyst model may be reduced. Further, emissions control may be improved by maintaining the catalyst at a desired fractional oxidation state. In addition, emissions during cold start may be accurately predicted for real time fueling control. Another advantage of the present approach is that it offers a non-intrusive catalyst monitor for control and diagnostics, which is less dependent on sensor location and hence will be equally applicable to both partial and full volume catalyst systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

To reduce the breakthrough of emissions, catalysts may utilize oxygen storage material, for example ceria in the form of cerium oxide, to provide buffer for oxygen during rich or lean excursions. The air-fuel ratio entering the catalyst may be controlled such that the oxidation state of the catalyst is maintained at a desired level. In one example model of the present disclosure, the concentration of various exhaust gas species, such as $H_2$, CO, NOx, HC, and $O_2$, at the inlet through the outlet of the catalyst may be modeled using a simplified one-dimensional model grouping the various exhaust gas species into two or fewer mutually exclusive groups. The model accounts for complex catalyst dynamics, such as diffusion limitations and reaction in the washcoat and catalyst aging and gradients accounted for in internal and external mass transfer coefficients, and simplifies the dynamics into a set of equations averaged over space and time with a reduced number of chemical species achieved by lumping them into only two or fewer groups. The model equations track the balance of only the two or fewer groups of exhaust species in the fluid phase and in the washcoat of the catalyst. The model can accurately predict emissions during cold start while reducing computational requirements for real time control of fuel injection during engine operation. Further, the model compensates for overall energy balance in the fluid phase and the washcoat of the catalyst.

Figure 1:
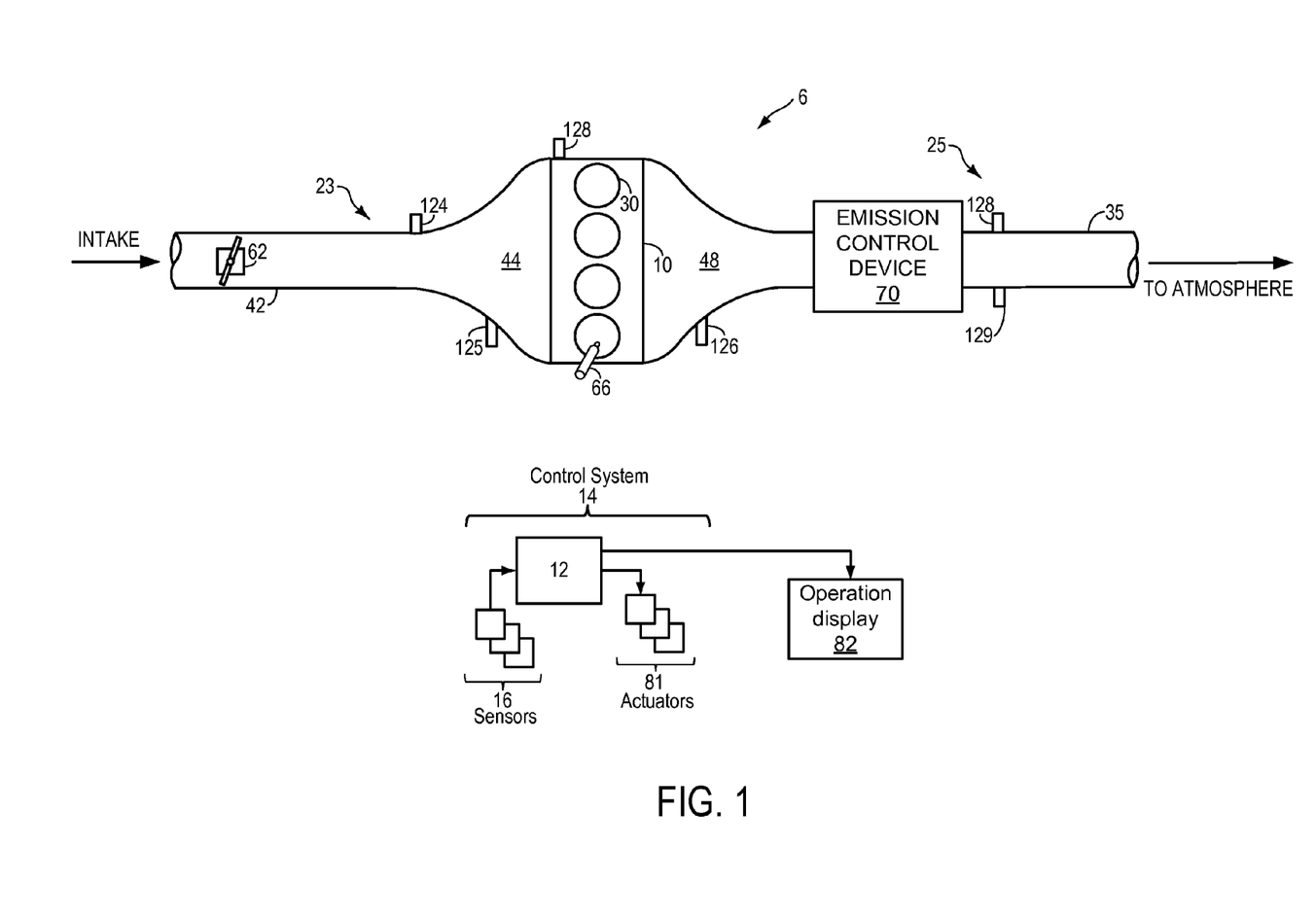
FIG. 1 schematically shows an example vehicle system.

In particular, the model may track the change in the concentration of two groups of exhaust species, for example an oxidants group and a reductants group, in order to determine a fractional oxidation state of the catalyst, which may be used to control the air-fuel ratio of the engine. The grouping of the chemical exhaust species into an oxidant group and a reductant group further decreases real-time fueling control since both groups can be selected to have almost similar molecular masses and allows for a single diffusivity value to be used. Further, a catalyst gain may be determined and applied to the model to track a change in total oxygen storage capacity, which may indicate whether or not the catalyst is degraded. FIG. 1 shows an example engine including a catalyst and a control system. FIGS. 2-5 illustrate various control routines that may be carried out by the engine of FIG. 1.

FIG. 1 shows a schematic depiction of a vehicle system 6. The vehicle system 6 includes an engine 10 having a plurality of cylinders 30. The engine 10 includes an intake 23 and an exhaust 25. The intake 23 includes a throttle 62 fluidly coupled to the engine intake manifold 44 via an intake passage 42. The exhaust 25 includes an exhaust manifold 48 leading to an exhaust passage 35 that routes exhaust gas to the atmosphere. The exhaust 25 may include one or more emission control devices 70, which may be mounted in a close-coupled position in the exhaust. One or more emission control devices may include a three-way catalyst, lean NOx trap, diesel or gasoline particulate filter, oxidation catalyst, etc. It can be appreciated that other components may be included in the engine such as a variety of valves and sensors.

Engine 10 may receive fuel from a fuel system (not shown) including a fuel tank and one or more pumps for pressurizing fuel delivered to the injectors 66 of engine 10. While only a single injector 66 is shown, additional injectors are provided for each cylinder. It can be appreciated that the fuel system may be a returnless fuel system, a return fuel system, or various other types of fuel system. The fuel tank may hold a plurality of fuel blends, including fuel with a range of alcohol concentrations, such as various gasoline-ethanol blends, including E10, E85, gasoline, etc., and combinations thereof.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (such as a linear UEGO sensor) located upstream of the emission control device, temperature sensor 128, and downstream exhaust gas sensor 129 (such as a binary HEGO sensor). Other sensors such as pressure, temperature, and composition sensors may be coupled to various locations in the vehicle system 6, as discussed in more detail herein. In one example, an actuator may include a "message center" including an operation display 82 where, in response to an indication of catalyst degradation, a message may be output to a vehicle operator indicating a need to service the emission system, for example. As another example, the actuators may include fuel injector 66, and throttle 62. The control system 14 may include a controller 12. The controller may receive input data from the various sensors, process the input data, and trigger the actuators in response to the processed input data based on instructions or code programmed therein corresponding to one or more routines. Example control routines are described herein with regard to FIGS. 2-5.

For catalyst diagnostics, various input parameters into a catalyst model may be used. In one embodiment, the input parameters may include catalyst gain, air amount (AM) such as mass airflow rate from MAF sensor, catalyst temperature estimated based on engine operating conditions such as speed, load, etc., HEGO output, and UEGO output. In some embodiments, all the example inputs listed above may be used in the catalyst model. In another embodiment, a HEGO model may be used in series with the catalyst model. In such a model, the model estimated voltage is compared with the measured sensor voltage (e.g., HEGO voltage), and the error computed is then used to update the catalyst activity ($a_c$). The catalyst activity is used as an indicative of catalyst age for diagnostics. This model-based approach is non-intrusive and less dependent on the HEGO sensor location, making it equally valid for both partial and full volume catalyst. In other embodiments, only a subset of the input parameters may be used, such as catalyst temperature and catalyst gain.

Figure 2:
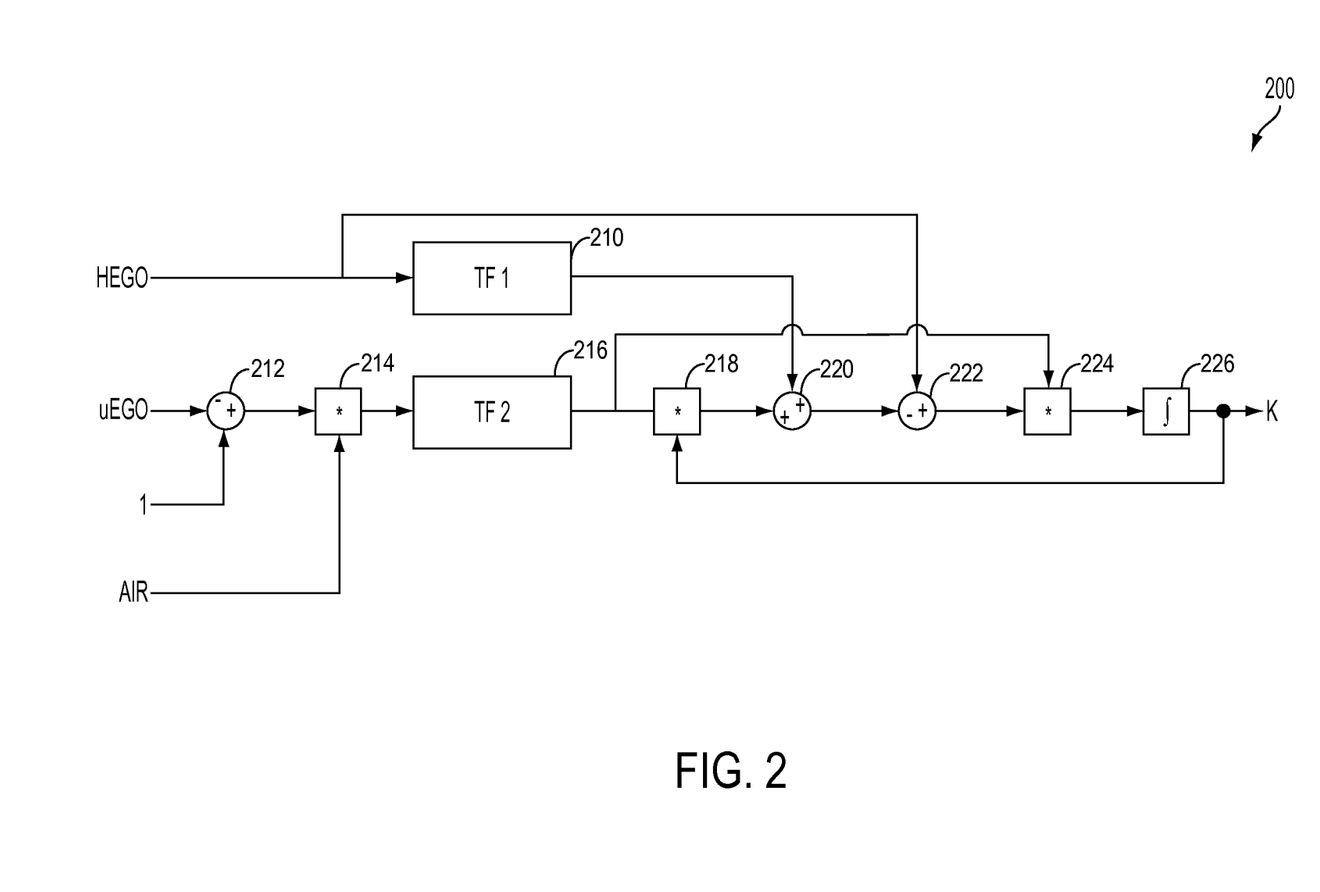
FIG. 2 illustrates a control operation for estimating catalyst gain.

The catalyst gain is an on-line estimation of the oxygen storage capacity of the catalyst, which reduces as the catalyst ages, and is illustrated in FIG. 2. The example function of FIG. 2 shows that the catalyst gain is a function of airmass, catalyst temperature, and relative exhaust air-fuel ratio (e.g., lambda). The catalyst gain can be indicative of catalyst conditions, such as an amount of oxygen stored in the catalyst, catalyst conversion efficiency, etc.

FIG. 2 illustrates an example function 200 of calculating catalyst gain from UEGO and HEGO sensor inputs. The catalyst gain may be defined as a linear, time-independent system that responds as an impulse to the inputs described above. Determining the catalyst gain relies on transfer functions (TF), which represent the relationship between the inputs and the outputs in the system. The two transfer functions (TF) are shown below in the laplace domain with s being the Laplace operator:

$$\frac{a}{s+a} \quad \text{Transfer function 1 (TF1)}$$

$$\frac{b(s)}{conv([xy],[xz])(s)} \quad \text{Transfer function 2 (TF2)}$$

Where w=conv(u,v) convolves vectors u and v. Algebraically, convolution is the same operation as multiplying the polynomials whose coefficients are the elements of u and v.

Determining the catalyst gain comprises determining the output of TF1 using input from the HEGO sensor at 210. This output may be fed into the output of TF2, as will be described in more detail below. At 212, the difference between the UEGO sensor output and lambda (e.g. 1) is determined, and this difference is multiplied by the air mass at 214. This product is used as the input for TF2 at 216. As the catalyst gain may be calculated and updated continually, the output of previous catalyst gain determinations may be fed into the function at 218. The product of TF2 and previous catalyst gain may be added to the output of TF1 at 220. At 222, the difference is determined between the input from the HEGO sensor and the product of 220, and this is multiplied by the output of TF2 at 224. To determine the catalyst gain, K, the integral is taken at 226 of the product determined in 224.

Figure 3A:
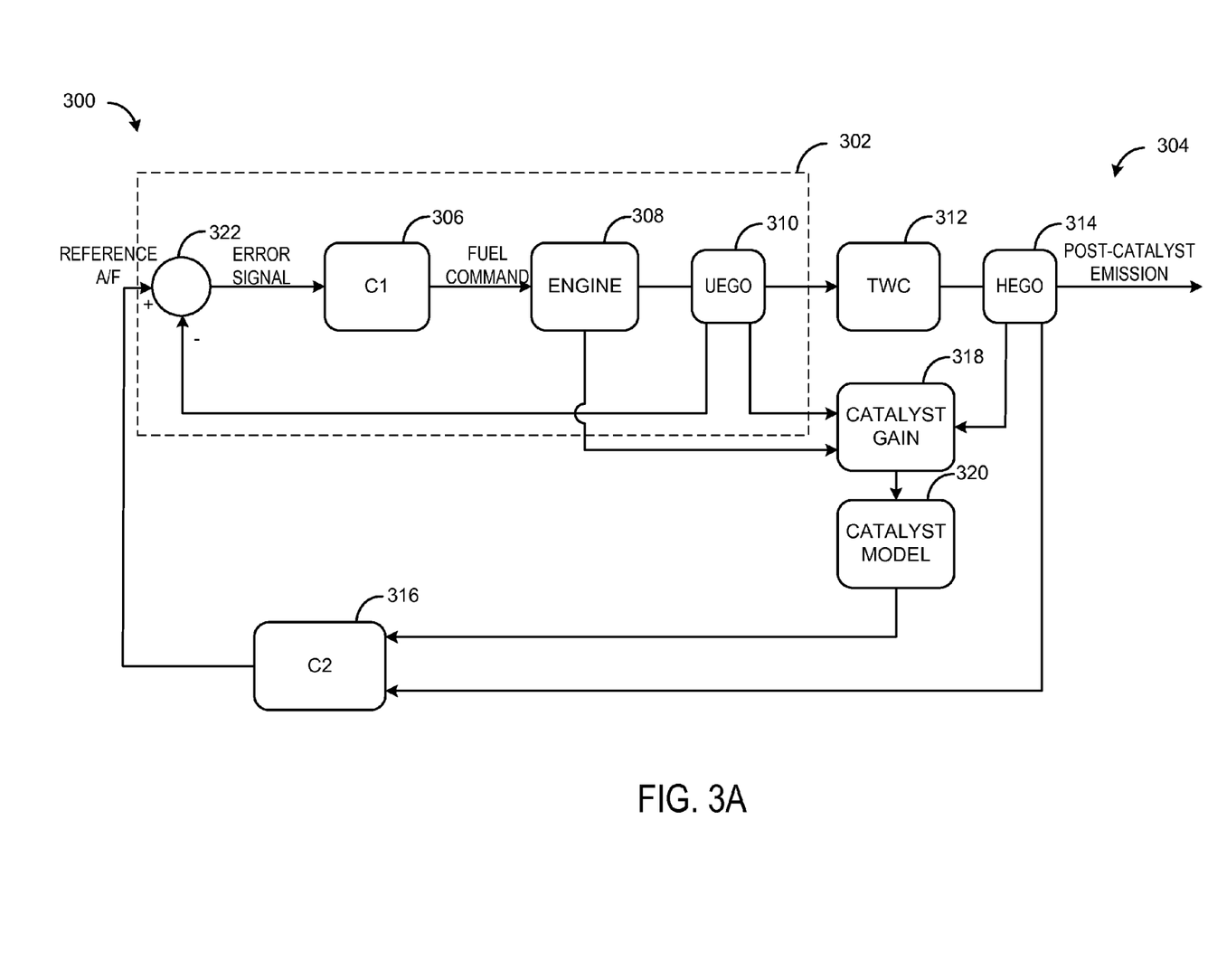
FIGS. 3A-3C schematically show example diagrams of inner and outer loop control strategies.
Figure 3B:
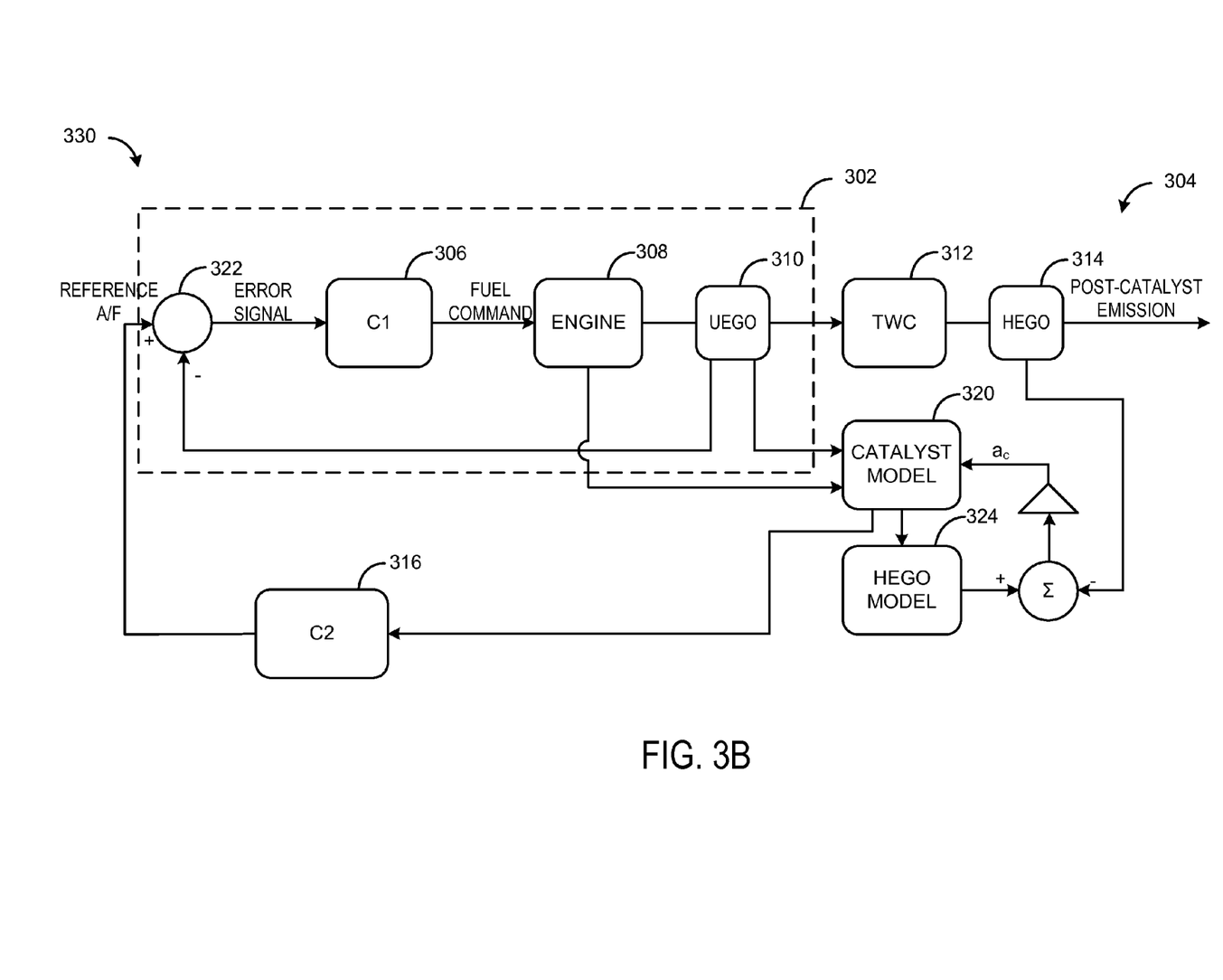

FIGS. 3A-3B are example diagrams depicting inner loop and outer loop control strategies for maintaining air-fuel ratio in an engine. Engine 10 and emission control device 70 of FIG. 1 are non-limiting examples of engine components which may be monitored and/or controlled using the following control strategies. FIG. 3A depicts an example diagram 300 including an inner loop 302 and an outer loop 304. The inner loop 302 control strategy includes a first air-fuel controller C1 306, which supplies a fuel command to the engine 308. The engine produces exhaust, the oxygen concentration of which is determined by an upstream sensor, such as a UEGO 310, before reaching a catalyst, such as TWC 312. The outer loop 304 includes feedback from a downstream oxygen sensor, such as HEGO 314, which is fed to a second air-fuel controller C2 316. Output from a catalyst gain model 318 (see FIG. 2), which receives input from UEGO 310, engine 308, and HEGO 314, is fed into a catalyst model 320 (see FIG. 5). As will be explained in more detail below, the catalyst model determines a total oxygen storage capacity and fractional oxidation state of the catalyst. A difference may be determined between the output of C2 and the UEGO signal at 322, which is output as an error signal to the first controller C1.

FIG. 3B depicts an example diagram 330 that is similar to the control strategy of diagram 300 of FIG. 3A, except the catalyst model 320 receives input from a HEGO model 324 rather than the catalyst gain model. HEGO model 324 may be used in series with the catalyst model 320. The HEGO model 324 compares HEGO voltage as predicted by the catalyst model 320 to measured HEGO voltage. The error computed is then used to update the catalyst activity ($a_c$).

Figure 3C:
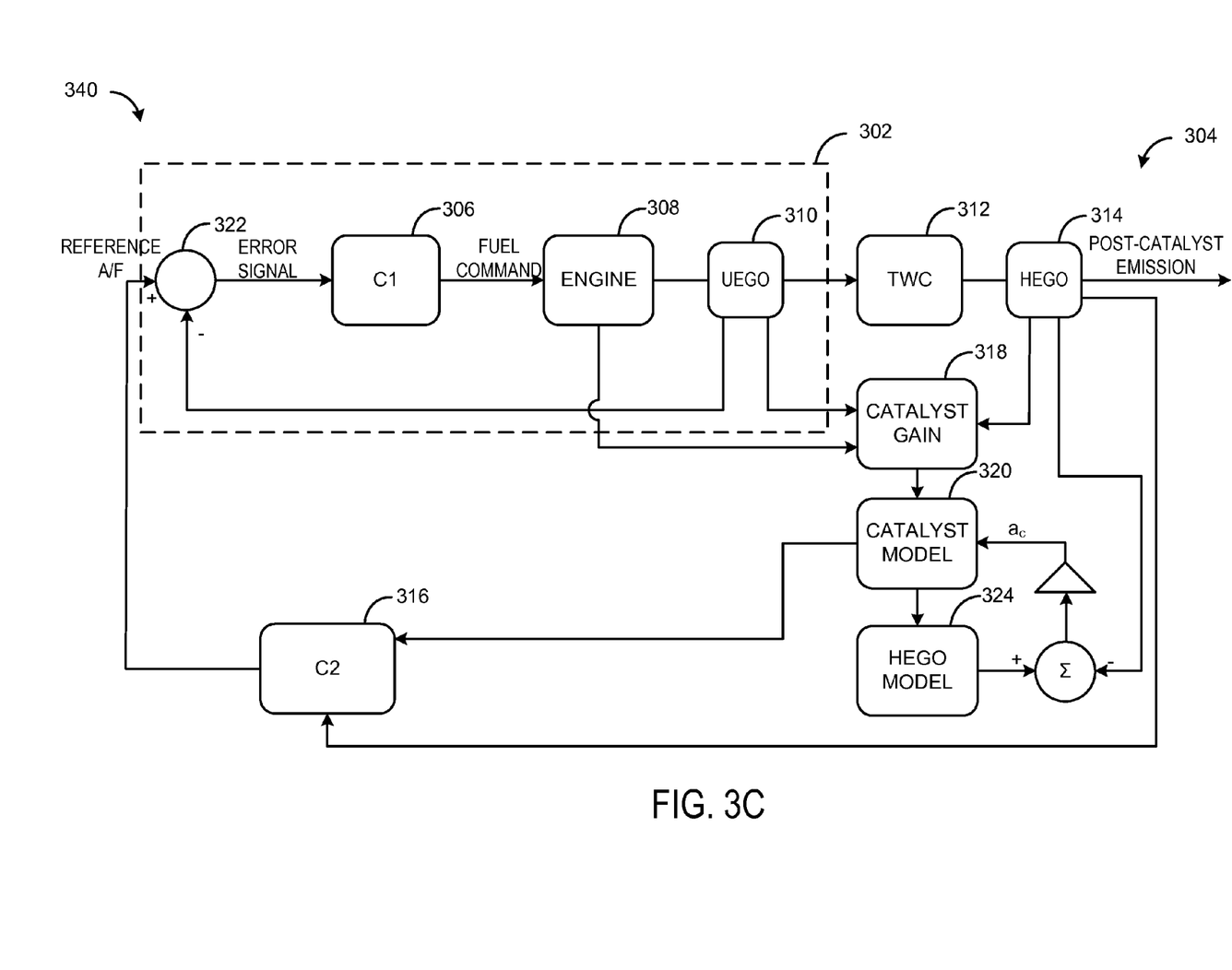

FIG. 3C depicts an example diagram 340 with a control strategy wherein the catalyst model 320 receives input from both the catalyst gain model 318 and the HEGO model 324.

Figure 4:
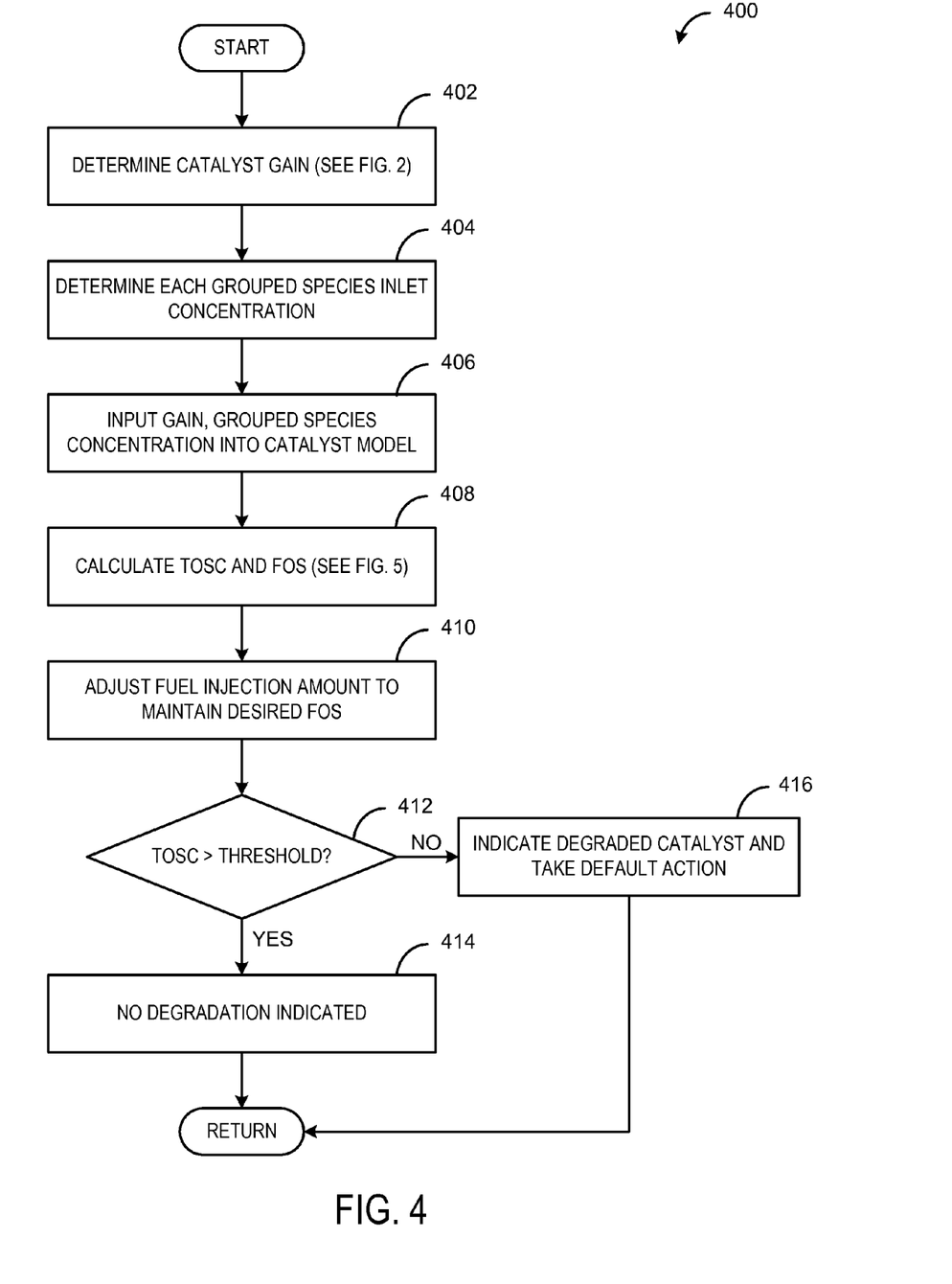
FIG. 4 is a flow chart illustrating an example method for monitoring a catalyst according to an embodiment of the present disclosure.

FIG. 4 is a flow chart illustrating a method 400 for monitoring a catalyst according to an embodiment of the present disclosure. Method 400 may be carried out by an engine control system, such as control system 14 of FIG. 1, using feedback from various engine sensors. At 402, method 400 includes determining catalyst gain. Catalyst gain may be determined according to the process described above with respect to FIG. 2. At 404, the concentration of the grouped exhaust species at the inlet of the catalyst is determined. Determining the concentration of the inlet species may include determining the concentration of two or fewer groups comprised of $O_2$, $H_2O$, CO, HC, NOx, $H_2$, and $CO_2$. Further, the species may be grouped in an oxidant group and a reductant group. The inlet species concentrations may be determined based on one or more of air mass, temperature, air-fuel ratio, engine speed, spark timing, and load. For example, the grouped species concentrations may be mapped to air mass, temperature, air-fuel ratio, and engine speed offline, and the concentrations stored in a look-up table in the memory of the control system.

At 406, the catalyst gain and species concentration are input into a catalyst model. In another embodiment, a HEGO model is used to update the catalyst activity in real time instead of catalyst gain. The catalyst model includes a set of equations averaged over space and time, a balance in the fluid phase of the catalyst for the grouped species, a balance in the washcoat of the catalyst for the grouped species, the energy balance of the fluid phase and washcoat, and the oxidation/reduction balance of ceria in the catalyst. At 408, the total oxygen storage capacity and fractional oxidation state of the catalyst are determined from the catalyst model, which will be explained in greater detail with respect to FIG. 5 below. At 410, fuel injection is adjusted to maintain a desired fractional oxidation state. For example, it may be desired to maintain the fractional oxidation state of the catalyst (e.g., the fractional oxidation of ceria within the catalyst) at a desired level, calibrated based on engine load and temperature, for optimal performance, such as 50%.

At 412, it is determined if the total oxygen storage capacity of the catalyst is greater than a threshold. The total oxygen storage capacity of the catalyst is indicative of the state of the catalyst, e.g., a fresh catalyst will have a relatively high oxygen storage capacity while a degraded catalyst will have a relatively low oxygen storage capacity, due to the diminished capacity of the ceria to store oxygen. The total oxygen storage capacity of a fresh catalyst may be determined based on the amount of ceria present in the catalyst during production, or it may be determined during initial operation of the catalyst. The threshold may be a suitable threshold below which the catalyst ceases to effectively control emissions. If the total oxygen storage capacity is greater than the threshold, no degradation is indicated at 414, and then method 400 returns. If the total oxygen storage capacity is not greater than the threshold, that is if the oxygen storage capacity is less than the threshold, catalyst degradation is indicated 416, and default action is taken. Default action may include notifying an operator of the vehicle via a malfunction indicator lamp, setting a diagnostic code, and/or adjusting engine operating parameters in order to reduce emissions production. Method 400 then returns.

Figure 5:
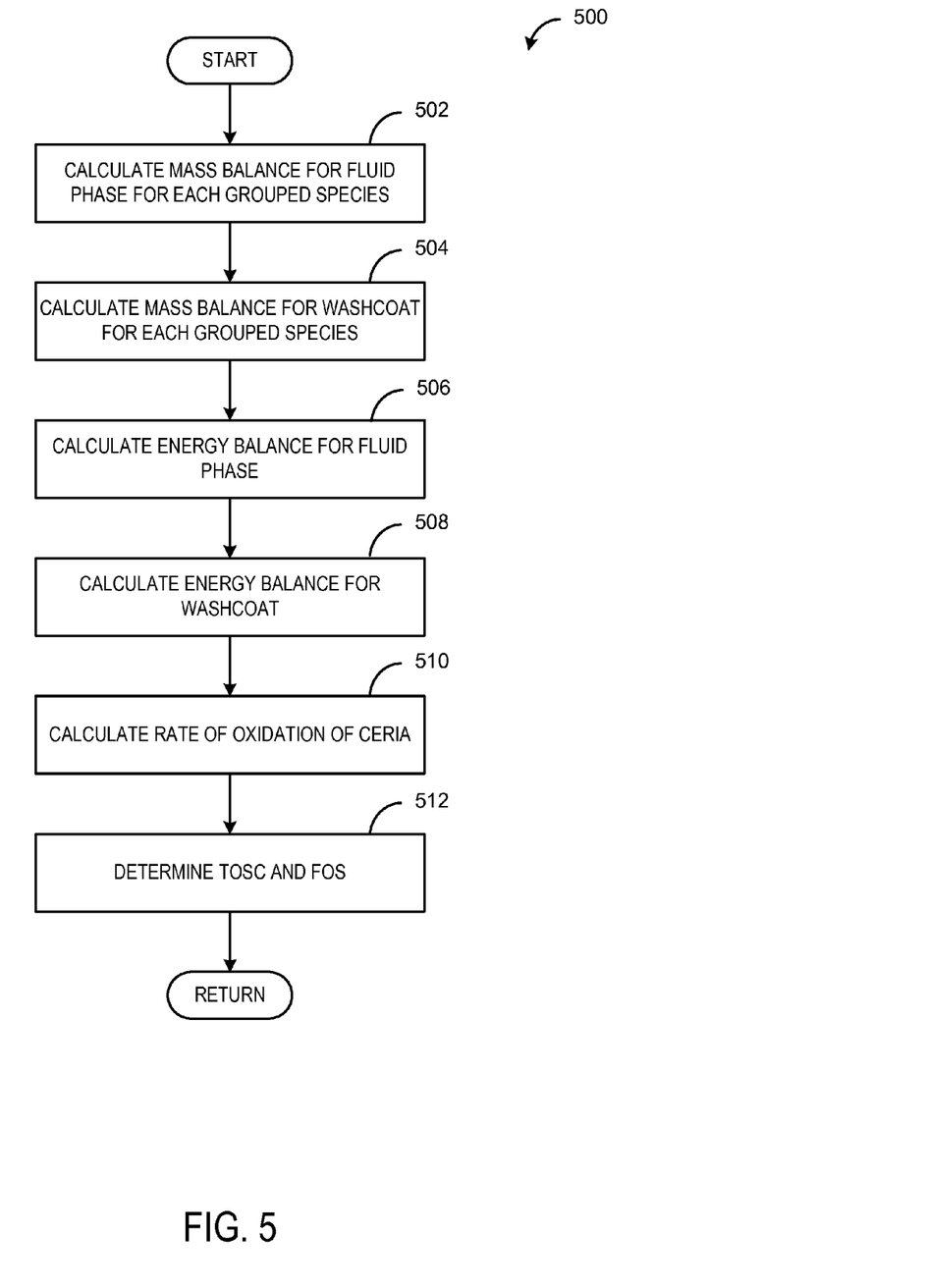
FIG. 5 is a flow chart illustrating an example method for determining an oxidation state of a catalyst according to an embodiment of the present disclosure.

FIG. 5 is a flow chart illustrating a method 500 for determining an oxidation state of a catalyst using a catalyst model. Method 500 may be carried out by engine control system 14 during execution of method 400 of FIG. 4. At 502, the mass balance for the fluid phase of the catalyst for each group of species is calculated. The mass balance accounts for the transfer of each group of species mass from the fluid phase to the washcoat. The mass balance for the fluid phase may be calculated using the following equation (1):

$$\frac{\partial X_{fm}}{\partial t} = -\langle u \rangle \frac{\partial X_{fm}}{\partial x} - \frac{k_{mo}}{R_\Omega}(X_{fm} - \langle X_{wc} \rangle)$$

Where $X_{fm}$ is the mole fraction of gaseous species in the bulk fluid phase, $\langle X_{wc} \rangle$ is the mole fraction of the species in the washcoat, $R_\Omega$ is the hydraulic radius of the channel, $\langle u \rangle$ is the average feedgas velocity, and $K_{mo}$ is the mass transfer coefficient between the fluid and the washcoat, defined as:

$$k_{mo}^{-1} = k_{me}^{-1} + k_{mi}^{-1}$$

Here, $k_{me}$ and $k_{mi}$ are the external and internal mass transfer coefficients. The gradients in the transverse direction are accounted for by the use of the internal and external mass transfer coefficients, computed using the Sherwood number (Sh) correlations. The external mass transfer coefficient $k_{me}$ is defined as:

$$k_{me} = \frac{D_f Sh}{4R_\Omega}$$

Here, $D_f$ is a gas phase diffusivity matrix and Sh is a diagonal matrix given by $Sh = Sh_\infty I$, where I is the identity matrix. A positional dependent Sherwood number Sh, defined for the fully developed flow with constant flux boundary condition is $$Sh = Sh_\infty + \frac{0.272\left(\frac{P}{z}\right)}{1 + 0.083\left(\frac{P}{z}\right)^{\frac{2}{3}}}$$

where $Sh1 = 3:2$ for rounded square channel.

Similarly, the concentration gradient within the washcoat and diffusional effect is captured by the internal mass transfer coefficient defined as:

$$k_{mi} = \frac{D_s sh_i}{\delta_c}.$$

where $D_s$ is the washcoat diffusivity matrix and $Sh_i$ is the internal Sherwood number matrix evaluated as a function of Thiele $\phi$ matrix:

$$Sh_i = Sh_{i,\infty} + (I + \Lambda\Phi)^{-1}\Lambda\Phi^2.$$

The effective rate constant is defined as:

$$kieff = \left(-\frac{1}{C_{Total}} \frac{R_t(X)}{X_t}\right)_{X = X_{fm}}$$

in which case $\phi^2$ becomes a diagonal matrix with the diagonal terms defined as:

$$\Phi_{ii}^2 = \frac{\delta_c^2}{D_{s,i}} K_{i,eff}$$

The grouping of the chemical exhaust species into an oxidant group and a reductant group allows for the use of a single value of diffusivity as both groups have almost similar molecular masses. In one example, the oxidant and reductant groups are selected specifically to provide a single valve of diffusivity, with that same value used in the one-dimensional model for both the oxidant and reductant groups in determining, in real-time during engine operation, the various species and values in the model, which are then used to adjust fueling to achieve desired oxidant and reductant states across the catalyst. Such an advantageous operation is particularly suited to the one-dimensional model as compared to other models because of the unique interaction between the two grouped species upon the various simplifications and mathematical manipulations described here. Thus, methods described herein estimating the various parameters may include a single valve of diffusivity, that same single valve used for both of the grouped oxidants and grouped reductants in the diagonal matrix, during engine operation to thereby improve determination and actual injection of fuel amounts to the engine.

At 504, the mass balance for the washcoat for each group of species, which accounts for the contribution from the mass transfer from the interface to the bulk washcoat and consumption due to the reaction, is calculated using the following equation (2):

$$\epsilon_w \frac{\partial \langle X_{wc} \rangle}{\partial t} = \frac{1}{C_{Total}} v^T r + \frac{k_{mo}}{\delta_c}(X_{fm} - \langle X_{wc} \rangle)$$

Where $r$ is the reaction rate, $\epsilon_w$ is the porosity of the washcoat, $\upsilon$ represents the stoichiometric matrix, and $\delta_c$ is the washcoat thickness.

At 506, the energy balance for the fluid phase is calculated, using the following equation (3):

$$\rho_f Cp_f \frac{\partial T_f}{\partial t} = -\langle u \rangle \rho_f Cp_f \frac{\partial T_f}{\partial x} - \frac{h}{R_\Omega}(T_f - T_s)$$

where $\rho_f$ is the average density of gas, $T_f$ is the temperature of fluid phase, $T_s$ is the temperature of the solid phase, $Cp_f$ is the specific heat capacity, and h is the heat transfer coefficient.

At 508, the energy balance for the washcoat is calculated, using the equation (4):

$$\delta_w \rho_w Cp_w \frac{\partial T_s}{\partial t} = \delta_w k_w \frac{\partial^2 T_s}{\partial x^2} + h(T_f - T_s) + \delta_c r^T(-\Delta H)$$

where $\delta_c$ is the washcoat thickness and $\delta_w$ is the effective wall thickness (defined as the sum of $\delta s + \delta c$ where $\delta s$ is the half-thickness of wall), $\rho_w$ and $Cp_w$ are the effective density and specific heat capacity defined as:

$$\delta_w \rho_w Cp_w = \delta_c \rho_c Cp_c + \delta_s \rho_s Cp_s$$

and $$\delta_w k_w = \delta_c k_c + \delta_s k_s$$

where the subscript s and c represent the support and catalyst washcoat, respectively.

At 510, the rate of oxidation of ceria is calculated using the following equation (5):

$$\frac{\partial \theta}{\partial t} = \frac{1}{2TOSC}(r_{store} - r_{release})$$

Where $r_{store}$ and $r_{release}$ are the reaction rates for oxidation and reduction of ceria respectively and $\theta$ is the fractional oxidation state of ceria (FOS), $$\theta = \frac{[Ce_2O_4]}{[Ce_2O_4] + [Ce_2O_3]}$$

The rate of storage ($r_2$), $r_{store}$ and the rate of release ($r_3$), $r_{release}$ of oxygen from ceria may be based on the following equations:

$$r_2 = a_c A_2 \exp\left(\frac{-E_2}{RT}\right) X_{O2}(1-\theta) TOSC_{green}$$

$$r_3 = a_c A_3 \exp\left(\frac{-E_3}{RT}\right) X_A(\theta) TOSC_{green}$$

Where $a_c$ is the catalyst activity, or the aging parameter of the catalyst. The aging parameter of the catalyst is indicative of the oxygen storage state of the catalyst. For example, as the catalyst ages, its capacity to store oxygen may diminish. In one example, an aging parameter of one indicates a fresh catalyst, with decreasing aging parameters indicating decreased capacity to store oxygen. The aging parameter may be based on bulk estimates of upstream air/fuel ratio, downstream air/fuel ratio, air mass, and temperature. In some embodiments, the aging parameter may be computed from the predetermined catalyst gain, described with respect to FIG. 2. In another embodiment, a HEGO model is used in series with the catalyst model to estimate the downstream HEGO voltage and then, using the measured HEGO voltage, an error is computed which is used to update catalyst activity. The terms A and E indicate the pre-exponential factor and activation energy, respectively. A and E are tunable parameters which may be optimized offline, using a genetic algorithm or other non-linear constrained optimization.

At 512, the fractional oxidation state (FOS) and the total oxygen storage capacity (TOSC) are determined. The FOS may be determined using the equation for $\theta$ above. The TOSC represents the total oxygen storage capacity and as each ceria ($Ce_2O_3$) molecule stores half a mole of oxygen, the TOSC may be equivalent to half the total ceria capacity.

The initial and boundary conditions for the above equations are given as:

$$X_{fm,j}(x, 0) = X^0_{fm,j}(x), \langle X_{wc,j}(x, 0)\rangle = \langle X^0_{wc,j}(x)\rangle,$$

$$T_f(x, 0) = T^0_f(x), T_s(x, 0) = T^0_s(x),$$

$$\theta(x, 0) = \theta^0(x),$$

$$X_{fm,j}(0, t) = X^{in}_{fm,j}(t), T_f(0, t) = T^{in}_f(t),$$

$$\left.\frac{\partial T_s}{\partial x}\right|_{x=0} = 0, \left.\frac{\partial T_s}{\partial x}\right|_{x=L} = 0.$$

Thus, the methods 400 and 500 presented above with respect to FIGS. 4 and 5 provide for a method for an engine including a catalyst. The method comprises determining catalyst activity based on an error between predicted exhaust gas sensor output and measured exhaust gas sensor output; applying the catalyst activity and two or fewer grouped inlet exhaust species concentrations to a catalyst model including a set of equations averaged over time and space mass balances and energy balances of a fluid phase and washcoat of the catalyst to determine a total oxygen storage capacity and fractional oxidation state of the catalyst; maintaining a desired air-fuel ratio based on the total oxygen storage capacity and fractional oxidation state of the catalyst; and indicating catalyst degradation if the catalyst activity or total oxygen storage capacity is less than a threshold. In this way, each group of exhaust gas species may be input into a catalyst model, which averages catalyst dynamics over time and space, concurrently, such as temperature, composition, etc. Based on the catalyst model, air-fuel ratio may be controlled, and catalyst degradation may be indicated.

While the embodiment described with respect to FIGS. 4 and 5 calculates the mass balance for two or fewer grouped exhaust gas species comprised of: CO, HC, NOx, $H_2$, $H_2O$, $O_2$, and $CO_2$, thus increasing computational speed and accurately predicting cold start emissions. For example, the grouped species may be grouped into oxidants (e.g., $O_2$, and NOx) and reductants (e.g., HC, CO, and $H_2$).

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine exhaust method, comprising:
determining a fractional oxidation state of a catalyst based on reaction rates of each of an oxidant group comprising NOx, $O_2$, $H_2O$ and $CO_2$ exhaust gas species and a reductant group comprising CO, HC, $H_2$, $H_2O$ exhaust gas species throughout a catalyst, a one-dimensional model averaged over space and time, and mass balance and energy balance equations for a fluid phase and a washcoat of the catalyst; and
adjusting a fuel injection amount based on the fractional oxidation state.

2. The method of claim 1, wherein the exhaust gas species comprise chemical exhaust gas species.

3. The method of claim 2, wherein a single value of diffusivity is used in the mass balance equations for both the oxidant group and the reductant group.

4. The method of claim 3, wherein adjusting the fuel injection amount based on the fractional oxidation state of the catalyst is employed during cold start of an engine.

5. The method of claim 1, further comprising determining an estimated total oxygen storage capacity and adjusting the fuel injection amount based on the estimated total oxygen storage capacity, wherein the estimated total oxygen storage capacity is maintained at 50%.

6. The method of claim 5, further comprising indicating catalyst degradation if the estimated total oxygen storage capacity is below a capacity threshold or if a determined catalyst activity is below a calibrated threshold.

7. The method of claim 5, wherein determining the estimated total oxygen storage capacity and the fractional oxidation state further comprises determining a concentration of each of the oxidant group and the reductant group at an outlet of the catalyst based on a concentration of each of the oxidant group and the reductant group at an inlet of the catalyst, wherein the concentrations of the oxidant group and the reductant group at the inlet of the catalyst are determined based on air mass, temperature, exhaust air/fuel ratio, and engine speed.

8. The method of claim 1, wherein reaction rates of the oxidant group and the reductant group are further based on a determined catalyst gain, and wherein the fractional oxidation state is further based on the determined catalyst gain.

9. The method of claim 1, wherein the fuel injection amount is further adjusted based on input from an oxygen sensor upstream of the catalyst and an oxygen sensor downstream of the catalyst, and wherein the fuel injection amount is adjusted in order to maintain the fractional oxidation state at a threshold level calibrated based on engine load and temperature.

10. A system comprising:
a catalyst positioned in an engine exhaust system; and
a controller including non-transitory instructions stored in memory to:
determine a catalyst activity, a total oxygen storage capacity, and a
fractional oxidation state of the catalyst based on a catalyst model that tracks a change in a concentration of each of a reductant group comprising CO, HC, $H_2$, $H_2O$ exhaust gas species and an oxidant group comprising NOx, $O_2$, $H_2O$ and $CO_2$ exhaust gas species concentrations through the catalyst, the catalyst model comprising a one-dimensional model averaged over space and time, as well as mass balance and energy balance equations for a fluid phase and a washcoat of the catalyst;
indicate catalyst degradation if the catalyst activity or the total oxygen storage capacity is below a threshold; and
adjust a fuel injection amount if the fractional oxidation state is outside a threshold range.

11. The system of claim 10, wherein the total oxygen storage capacity is a function of an estimated error between a model predicted exhaust gas sensor voltage and a measured exhaust gas sensor voltage.

12. The system of claim 11, wherein a catalyst gain is based on upstream air/fuel ratio, downstream air/fuel ratio, air mass, and temperature.

13. The system of claim 10, the controller further including non-transitory instructions stored in memory to determine a concentration of each of the oxidant group and the reductant group at an inlet of the catalyst based on air mass, temperature, exhaust air/fuel ratio, and engine speed, wherein the oxidant group comprises one or more of NOx, $O_2$, $H_2O$, and $CO_2$, wherein the reductant group comprises one or more of CO, HC, $H_2$, and $H_2O$, and wherein the catalyst is a three-way catalyst.

14. A method for an engine including a catalyst, comprising:
determining a catalyst activity based on an error between predicted exhaust gas sensor output and measured exhaust gas sensor output;
applying the catalyst activity to a catalyst model and applying concentrations of each of an oxidant group comprising NOx, $O_2$, $H_2O$ and $CO_2$ exhaust gas species and a reductant group comprising CO, HC, $H_2$, $H_2O$ exhaust gas species at an inlet of the catalyst to the catalyst model to determine a total oxygen storage capacity and a fractional oxidation state of the catalyst, the catalyst model including a one dimensional model averaged over space and time, as well as mass balances and energy balances of a fluid phase and a washcoat of the catalyst;
adjusting a fuel injection amount maintaining a desired air fuel ratio based on the total oxygen storage capacity and the fractional oxidation state of the catalyst; and
indicating catalyst degradation if the catalyst activity or the total oxygen storage capacity is less than a threshold.

15. The method of claim 14, wherein the fractional oxidation state of the catalyst further comprises a fractional oxidation state of ceria in the catalyst determined based on a change in oxygen concentration through the catalyst.

16. The method of claim 14, wherein the exhaust gas species comprise CO, HC, NOx, $H_2$, $H_2O$, $O_2$, and $CO_2$.

17. The method of claim 14, further comprising adjusting the fuel injection amount based on input from an oxygen sensor upstream of the catalyst and an oxygen sensor downstream of the catalyst.

18. The method of claim 14, wherein the catalyst activity is indicative of the total oxygen storage capacity of the catalyst.

* * * * *